United States Patent [19]
Alary et al.

[11] Patent Number: 5,592,820
[45] Date of Patent: Jan. 14, 1997

[54] GAS TURBINE DIFFUSER

[75] Inventors: Jean-Paul D. Alary, Saint Maur Des Fosses; Michel Desaulty, Vert Saint Denis; Denis J. M. Sandelis, Nangis; Pierre Schroer, Brunoy, all of France

[73] Assignee: Societe National D'Etdue et de Construction de Moteurs D'Aviation S.N.E.C.M.A, Paris Cedex, France

[21] Appl. No.: 328,820

[22] Filed: Oct. 25, 1994

[30]   Foreign Application Priority Data

Oct. 27, 1993 [FR] France .................................. 93 12799

[51] Int. Cl.⁶ ...................................................... F02K 1/48
[52] U.S. Cl. .............................................................. 60/751
[58] Field of Search .............................. 60/751, 752, 747, 60/39.36, 39.75

[56]   References Cited

U.S. PATENT DOCUMENTS

| 4,527,386 | 7/1985 | Markowski | 60/39.36 |
| 5,077,967 | 1/1992 | Widener et al. | 60/751 |

FOREIGN PATENT DOCUMENTS

| 205220 | 5/1956 | Australia | 60/751 |
| 0120173 | 10/1984 | European Pat. Off. . | |
| 0523935 | 1/1993 | European Pat. Off. . | |
| 74688 | 12/1960 | France . | |
| 338058 | 6/1959 | Switzerland . | |

*Primary Examiner*—Timothy S. Thorpe
*Attorney, Agent, or Firm*—Bacon & Thomas

[57]   ABSTRACT

A diffuser for a turbojet engine is disclosed in which a plurality of diffuser inlets are arranged in a substantially circular array bounded by inner and outer diffuser walls and by a plurality of partitions extending generally radially from the axis of the annular diffuser. The plurality of diffuser inlets are located so as to receive air or oxidizer from the turbojet engine compressor and the radial partitions may be integrated into the compressor guide vanes. The diffuser has a plurality of sets of diffuser outlets, each set comprising a plurality of diffuser outlets arranged in a circular array about the central axis of the diffuser. The radius of each set of diffuser outlets is different from the radius of each of the other sets of diffuser outlets such that the entirety of diffuser outlets comprise a non-circular array. The diffuser may comprise three different sets of diffuser outlets, a first set directing air or oxidizer onto the baffle such that the air or oxidizer passes through openings in the baffle to feed the fuel injector heads. A second set of diffuser outlets may be curved outward at the outlet end so as to direct a portion of the air or oxidizer into the space defined between the outer combustion chamber wall and the outer casing. A third set of diffuser outlets may be curved inwardly at their downstream ends so as to direct a portion of the air or oxidizer into the space between the inner combustion and the inner casing.

13 Claims, 6 Drawing Sheets

GAS TURBINE DIFFUSER

BACKGROUND OF THE INVENTION

The present invention relates a diffuser for a gas turbine engine, more particularly such a diffuser having an inlet with a generally circular configuration and an outlet having a non-circular configuration.

Diffusers in gas turbine engines are typically located between a compressor supplying compressed air or oxidizer and the combustion chamber. In engines having annular combustion chambers, the combustion chamber is bounded by inner and outer walls which are located within and spaced from inner and outer casings. Upstream ends of the inner and outer combustion chamber walls are interconnected by an upstream end wall and are further connected by a baffle which is spaced from the upstream end wall in a direction towards the diffuser.

Compressed air or oxidizer emanating from the compressor is directed into the diffuser which decelerates the air or oxidizer flow and may direct it onto the baffle which has openings to allow the air or oxidizer to pass through the baffle and through the air inlets in the upstream end wall of the combustion chamber into the combustion chamber. In known fashion, the air emanating from the diffuser may also be utilized to cool the inner and outer walls of the combustion chamber and to be directed through openings in the inner and outer walls into the primary combustion zone of the combustion chamber.

Gas turbine engines, such as turbojet aircraft engines, may utilize a single or double fuel injection head to inject fuel into the combustion chamber. In a single fuel injector head engine, a single annular array of fuel injectors inject fuel into the combustion chamber. In a double fuel injector head, two annular arrays are utilized to inject fuel into the combustion chamber, one fuel injector head being located radially outwardly of the other fuel injector head. As is well-known in the art, one of the fuel injector heads may be utilized to inject fuel during take-off conditions which require high output and the other fuel injector head may be utilized to inject fuel into the combustion chamber during idling or low-power operating conditions.

The diffuser decelerates the air or oxidizer emanating from the compressor so as to decrease the pressure drops in the air or oxidizer and to insure that it is fed properly to the combustion chamber. If the turbojet engine utilizes a double fuel injector head construction, the diffuser may include an annular flow splitter which enables the air or oxidizer emanating from the diffuser to be directed toward each of the fuel injector heads. Such a flow splitter enables the air or oxidizer to also be detoured over the baffle into the space between the inner and outer walls and the inner and outer casings, respectively for cooling the inner and outer combustion chamber walls, feeding the primary combustion zones and for dilution of the combustion gases.

SUMMARY OF THE INVENTION

A diffuser for a turbojet engine is disclosed in which a plurality of diffuser inlets are arranged in a substantially circular array bounded by inner and outer diffuser walls and by a plurality of partitions extending generally radially from the axis of the annular diffuser. The plurality of diffuser inlets are located so as to receive air or oxidizer from the turbojet engine compressor and the radial partitions may be integrated into the compressor guide vanes. The diffuser has a plurality of sets of diffuser outlets, each set comprising a plurality of diffuser outlets arranged in a circular array about the central axis of the diffuser. The radius of each set of diffuser outlets is different from the radius of each of the other sets of diffuser outlets such that the entirety of diffuser outlets comprise a non-circular array. The diffuser may comprise three different sets of diffuser outlets, a first set directing air or oxidizer onto the baffle such that the air or oxidizer passes through openings in the baffle to feed the fuel injector heads. A second set of diffuser outlets may be curved outward at the outlet end so as to direct a portion of the air or oxidizer into the space defined between the outer combustion chamber wall and the outer casing. A third set of diffuser outlets may be curved inwardly at their downstream ends so as to direct a portion of the air or oxidizer into the space between the inner combustion chamber wall and the inner casing.

A flow splitter may also be utilized with the diffuser and may be incorporated into at least one of the sets of diffuser outlets so as to subdivide the flow from the diffuser outlets.

The diffuser according to the present invention restricts the pressure drops in the air or oxidizer due to detachment and due to the passage of the air or oxidizer over the injectors and other devices causing abrupt deviations from the upstream-to-downstream flow path. The diffuser eliminates these pressure drops by channeling the flow of air or oxidizer into separate flows upstream of the baffle and fuel injectors to eliminate the abrupt deviations in the flow path of the air or oxidizer which cause losses in pressure.

The diffuser comprises a non-circular array of diffuser outlets through which the air or oxidizer is directed by a plurality of conduits separated by radially extending partitions. The conduits are radially distributed into three sets of conduits feed flows of air or oxidizer into three flows, a first flow directed towards the baffle ($F_o$), a second flow directed toward the space between the external combustion chamber wall and the outer casing ($F_e$) and a third flow directed toward the space between the inner combustion chamber wall and the inner casing ($F_i$). Preferably, at least some of the radial partitions which define the sides of the conduits are integrated into the compressor guide vane system. The diffuser may comprise a single conduit between two consecutive partitions, or two radially diverging conduits separated by a splitting wedge.

The number of conduits or diffuser outlets may be equal in each of the sets of diffuser outlets, or the numbers in each set may be different from the numbers in other sets. Preferably, the number is equal to the number of fuel injectors of each fuel injector head, or a multiple of that number.

The outlets of the diffuser may be bounded by inner and outer walls having substantially sinusoidal configuration with the inner and outer walls being joined by the radially extending partitions.

In accordance with this invention, the air or oxidizer flows are directed toward the zones to be served by the air or oxidizer flow such that they do not directly impinge on the baffle or the fuel injector manifolds. Consequentially, the pressure drops incurred by the air or oxidizer flowing around these objects are substantially lowered or eliminated altogether.

DETAILED DESCRIPTION OF THE PREFERRED EMBODIMENTS

Figure 1:
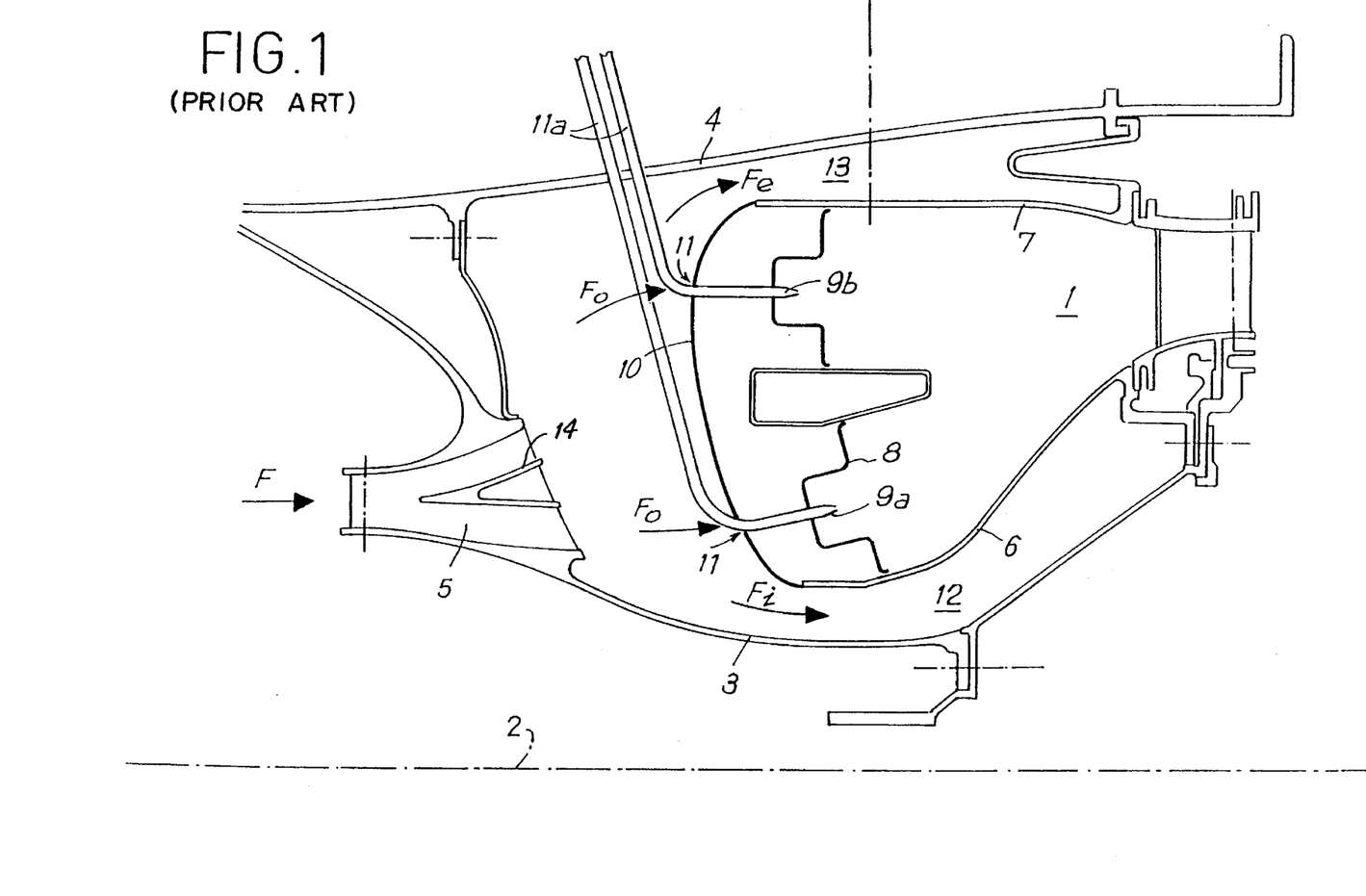
FIG. 1 shows a partial, cross-sectional view of a combustion chamber having a known type of diffuser.

FIG. 1 illustrates a known type of combustion chamber in which the combustion chamber 1 has an annular configuration extending around a central longitudinal axis 2. The combustion chamber 1 is bounded by inner wall 6 and outer wall 7 which are spaced from inner casing 3 and outer casing 4, respectively so as to define annular spaces 12 and 13. Upstream end wall 8 interconnects the inner wall 6 and outer wall 7 and defines an upstream boundary for the combustion chamber 1. Baffle 10, which is spaced from the upstream end wall 8 in an upstream direction (toward the left as viewed in FIG. 1) toward the engine compressor (not shown), also interconnects the inner combustion chamber wall 6 and the outer combustion chamber wall 7. Baffle 10 defines passages through which the fuel injection manifolds 11a extend to feed fuel to the two fuel injector heads 9a and 9b, respectively. As is well known in the art, in such a double fuel injector head engine, fuel injector head 9a is used under idle or low power conditions, while fuel injector head 9b operates under take-off conditions to inject fuel into the combustion chamber 1.

The openings 11 defined by baffle 10 enable air or oxidizer from the compressor flowing in the direction indicated by arrow F to pass through baffle and through air swirlers in the upstream end of the combustion chamber so as to be mixed with the fuel in the combustion chamber. Annular diffuser 5 generally separates the air or oxidizer flow F into portions directed generally towards the fuel injector heads 9a and 9b. As can be seen in FIG. 1, the diffuser 5 is located a significant distance upstream of the baffle 10. After encountering the baffle 10 the air or oxidizer is divided into a first flow $F_o$ which passes through the openings 11 feeding the combustion chamber end 8, a second flow $F_i$ which detours around the baffle 10 and passes into the annular space 12, and a third flow $F_e$ which is guided by the baffle into the annular space 13. The air or oxidizer flows $F_i$ and $F_e$ cool the combustion chamber walls 6 and 7, respectively and feed the primary combustion zones of the combustion chamber 1, in known fashion. An annular flow separator or splitter 14 is located adjacent to the outlet of the diffuser 5 so as to split the air or oxidizer flow F from the compressor (not shown) into flows directed generally toward the respective fuel injector heads 9a and 9b. Although these air or oxidizer flows are directed generally toward the fuel injector heads, the encounters between the air or oxidizer flows and the fuel supply manifolds 11a and the baffle 10 induce pressure drops in the air or oxidizer flows.

Figure 2:
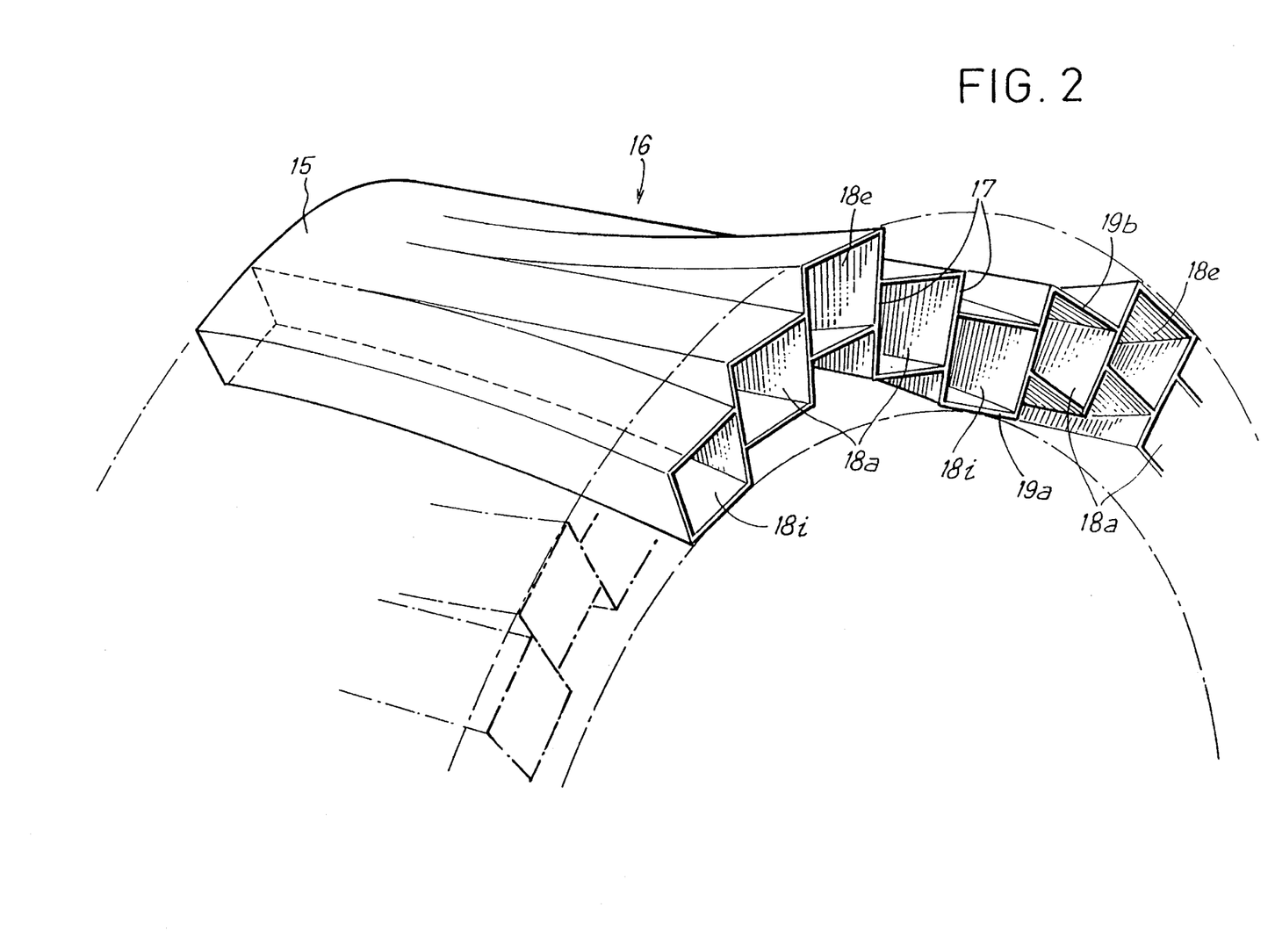
FIG. 2 is a partial, perspective view of the diffuser of a first embodiment of the invention.
Figures 3, 4:
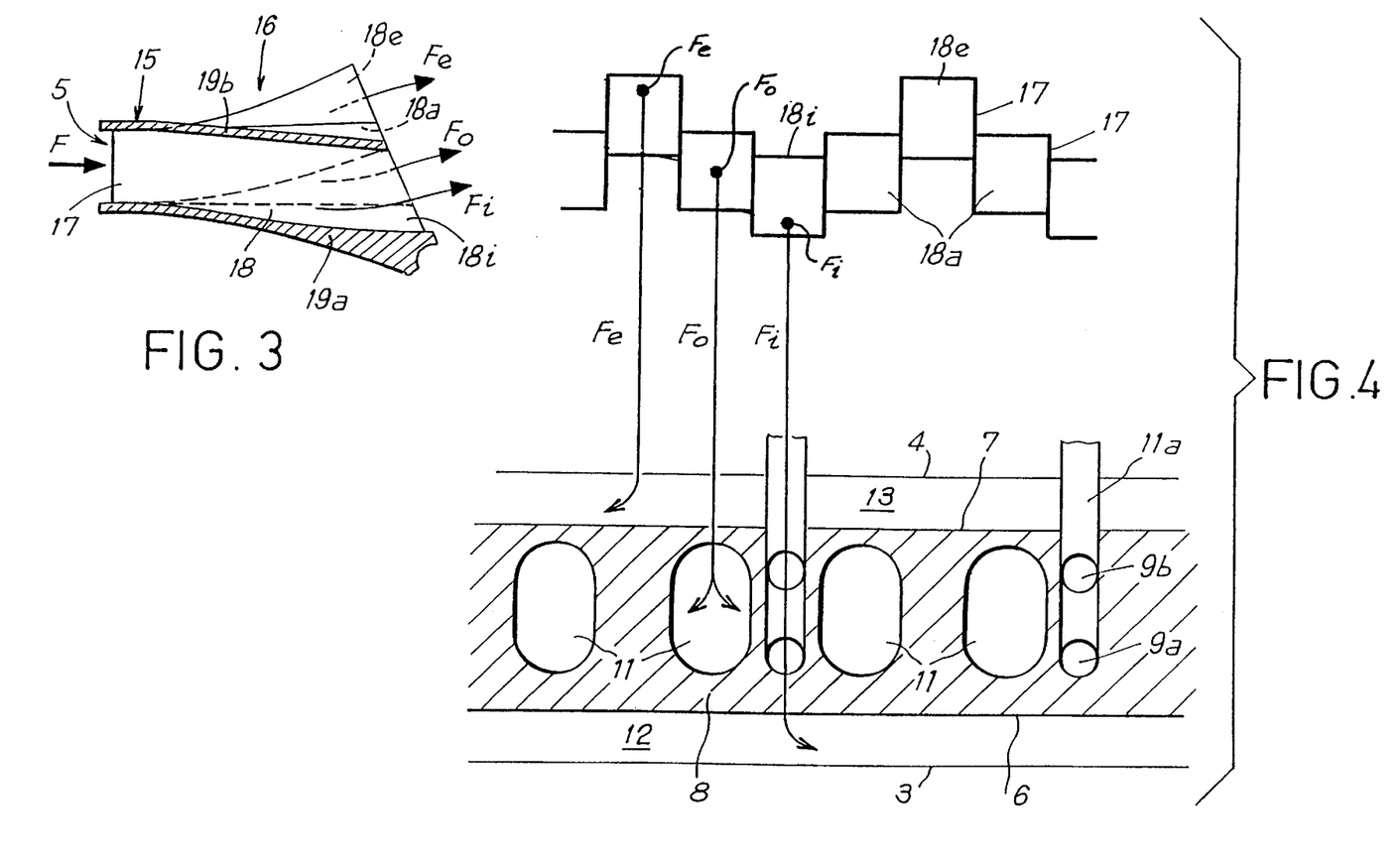
FIG. 3 is a cross-sectional view of the diffuser illustrated in FIG. 2.
FIG. 4 is a schematic representation of the diffuser illustrated in FIGS. 2 and 3 and its orientation with respect to the combustion chamber baffle.

A first embodiment of the diffuser according to the present invention is illustrated in FIGS. 2–4 wherein it can be seen that it has a generally annular configuration extending about the center or longitudinal axis 2 with an upstream or an inlet portion 15 comprising a substantially circular array of diffuser inlets. However, the downstream or diffuser outlet portion 16 has the diffuser outlets arranged in a non-circular array so as to better distribute the air or oxidizer flow towards the combustion chamber 1 and the annular spaces 12 and 13. The diffuser inlets and outlets are connected by a plurality of conduits 18 which are defined by inner and outer diffuser walls 19a and 19b, and are separated by partitions 17 which extend generally radially from the longitudinal axis 2. The conduits 18 may also include flow splitting wedges 20 (see FIG. 5) to allow partitioning air or oxidizer flow F from the compressor into circumferentially distributed individual air or oxidizer flow elements, and in case splitter wedges are utilized, also into radially distributed air or oxidizer flow elements. The air or oxidizer flow emanating from each of the diffuser outlets will deviate from the longitudinal axis 2 in relation to the slope of each of the conduits 18.

The conduits 18 are divided into three sets of conduits having three sets of outlets, each of the three sets having a varying slope relative to the longitudinal axis 2. Each of the sets comprises a plurality of diffuser outlets arranged in a substantially circular array about the longitudinal axis 2, but with the radius of each of the sets being different from other sets. Thus, as illustrated in FIG. 2, the diffuser outlets 18a comprise a first set of diffuser outlets, the outlets 18i comprise a second set of diffuser outlets, while the third set of diffuser outlets includes diffuser outlets 18e.

As best seen in FIGS. 3 and 4, the conduits 18 having the diffuser outlets 18a extend generally parallel to the longitudinal axis 2 and are circumferentially aligned with openings 11 defined by the baffle 10 such that air or oxidizer flow $F_0$ may pass through the openings 11 with minimal encounters with the baffle 10. Similarly, the conduits 18 having the diffuser outlets 18i have a downstream portion which is deflected inwardly towards the longitudinal axis 2 such that the air or oxidizer flow $F_i$ is directed toward the annular space 12, also with minimal encounters with the baffle 10. As illustrated in FIG. 4, the diffuser outlets 18i may be circumferentially aligned with the fuel injector manifolds 11a. The conduits 18 having the diffuser outlets 18e have their downstream ends curved outwardly away from the longitudinal axis 2 so as to direct a portion Fe on the air or oxidizer flow towards the annular space 13. These diffuser outlets may be circumferentially displaced from the fuel injector manifolds 11a so as to minimize contact between the air or oxidizer flow Fe and these components. By this arrangement, the pressure drops induced in the air or oxidizer flow by deflections around the baffle 10 and the fuel injection manifold 11a are considerably reduced.

As illustrated in FIGS. 2–4, in this embodiment, the downstream portion 16 of the diffuser 5 assumes the form of discrete offset portion of three steps regularly arrayed around the circumference of the diffuser. Each step forms one axially pointing conduit 18 which may deviate radially and which is circumferentially bounded by the radial portions 17 extending in the direction of the air or oxidizer flow. Some of the partitions 17 may be integrated into the outlet flow guide vanes of the high pressure compressor located upstream (towards the left as viewed in FIG. 3) of the diffuser 5. The air or oxidizer flow issuing from each of the diffuser outlets will form a precisely defined circumferential zone upstream of the combustion chamber 1.

The cross-sections of the diffuser outlets 18a, 18e and 18i are illustrated as having the same or similar configurations but it is to be understood that they may assume differing configurations without exceeding the scope of this invention. The number of conduits or diffuser outlets in each set is preferably equal to the number of fuel injectors, or a multiple of the number of fuel injectors mounted at the combustion chamber upstream end 8.

Figure 5:
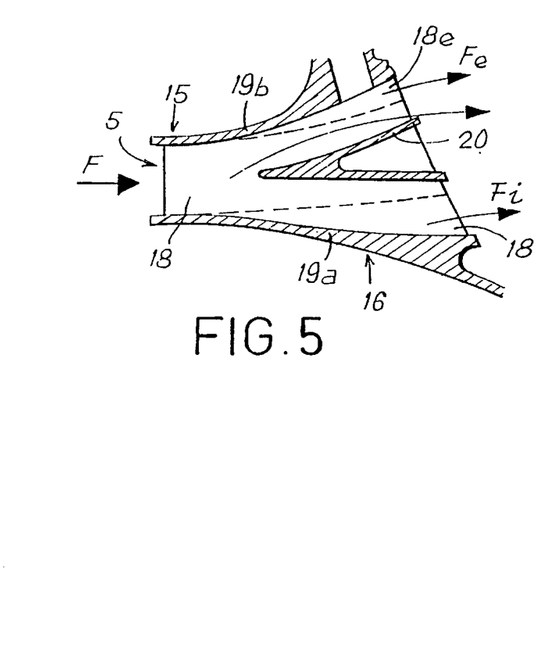
FIG. 5 is a cross-sectional view, similar to FIG. 3, illustrating a second embodiment of the diffuser according to the present invention.
Figure 6:
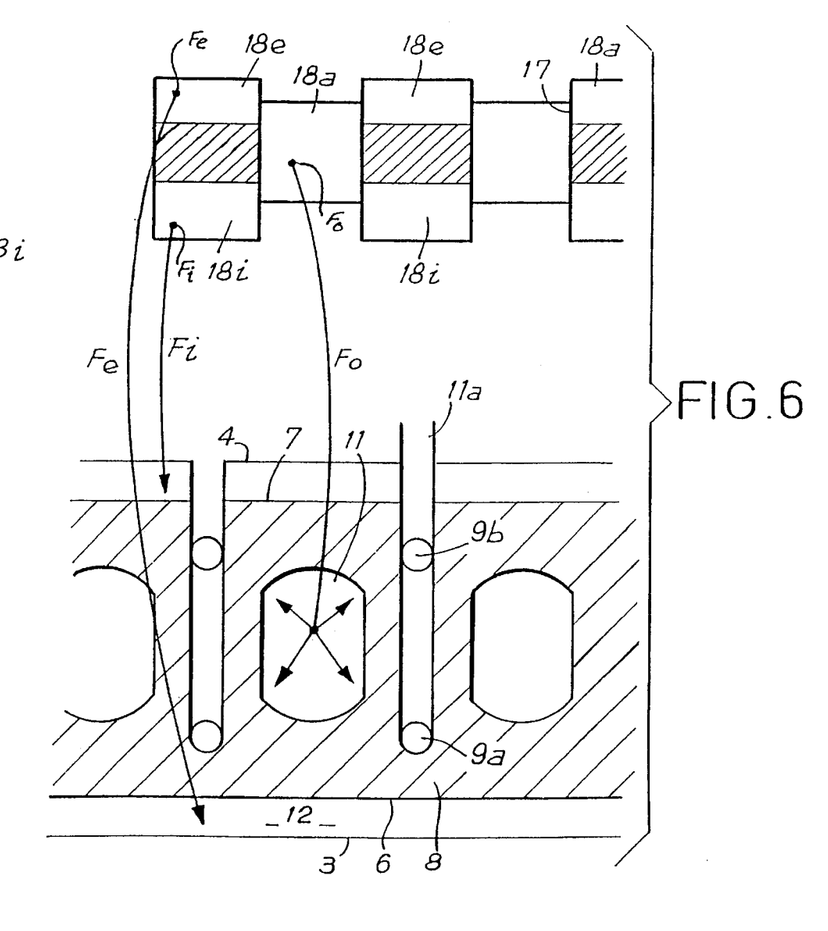
FIG. 6 is a schematic diagram of the diffuser illustrated in FIG. 5 illustrating its orientation with respect to the combustion chamber baffle.

In the embodiment illustrated in FIGS. 5 and 6 the diffuser 5 supplies air or oxidizer to a dual fuel injection head annular combustion chamber 1, but this configuration may also be utilized with a combustion chamber having a single fuel injection head. In this particular embodiment, splitter wedges 20 are located in conduits 18 and extend between opposite partitions 17 such that the downstream end of a conduit 18 is divided into two sets of diffuser outlets, 18e and 18i. As can be seen, the splitter wedge 20 has an apex facing in an upstream direction (towards the left as viewed in FIG. 5) and has extending from the apex a pair of diverging guide surfaces. As illustrated in FIG. 6, the conduits 18 having the splitter wedges 20 are circumferentially aligned with the fuel injector manifolds 11a and alternate with conduits 18 defining the diffuser outlets 18a, which in this particular embodiment have no splitter wedges. The air or oxidizer flow $F_0$ issuing from diffuser outlets 18a cools the baffle between the fuel injection heads 9a and 9b and then feeds the air or oxidizer to the fuel injector swirlers and any air orifices present in the baffle.

Figure 7:
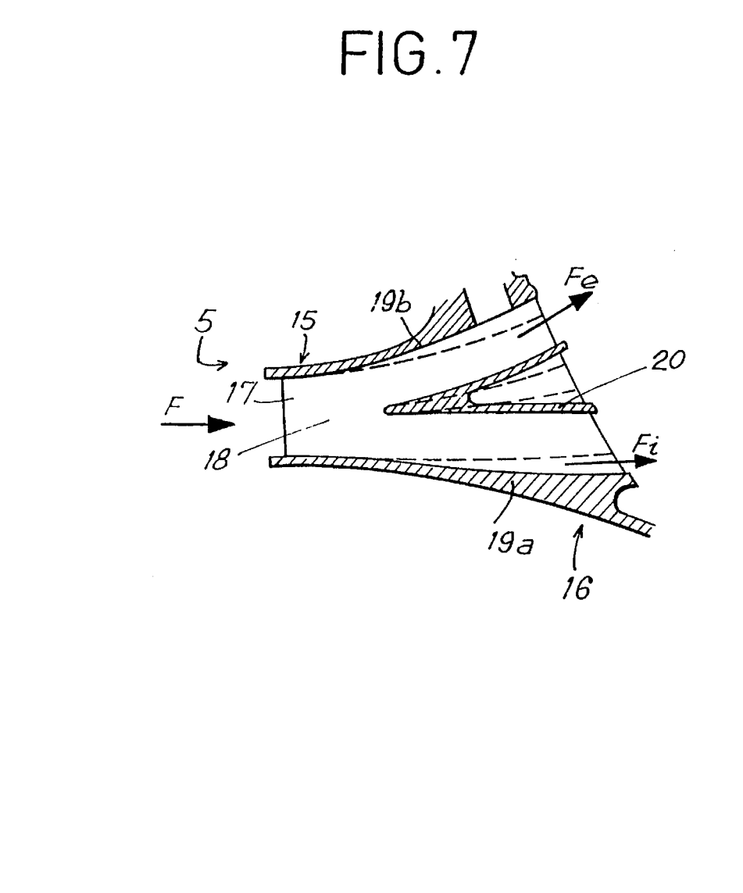
FIG. 7 is a view similar to FIG. 3 illustrating a third embodiment of the present invention.
Figure 8:
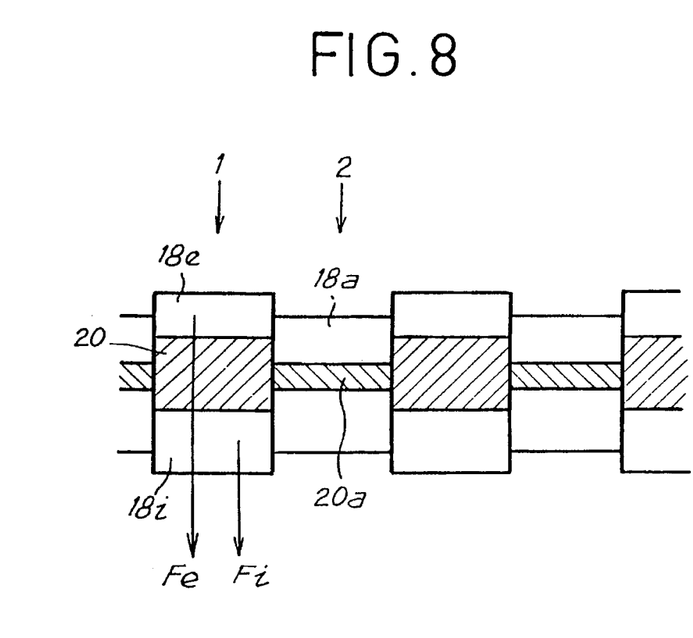
FIG. 8 is a partial downstream end view of the diffuser illustrated in FIG. 7.

In FIGS. 7 and 8, the conduits 18 defining the diffuser outlets 18a have a second splitter wedge 20a to further divide air or oxidizer flow emanating from these diffuser outlets. This embodiment is specific to a dual head fuel injection combustion chamber and splits the air or oxidizer flow at $F_0$ into two flows, one of which feeds the fuel injection head 9a and the other which feeds air or oxidizer to the fuel injection head 9b. As illustrated FIG. 7, the diverging surfaces of the splitter wedge 20a have a smaller included angle than do the guide surfaces on splitter wedge 20.

Figure 9:
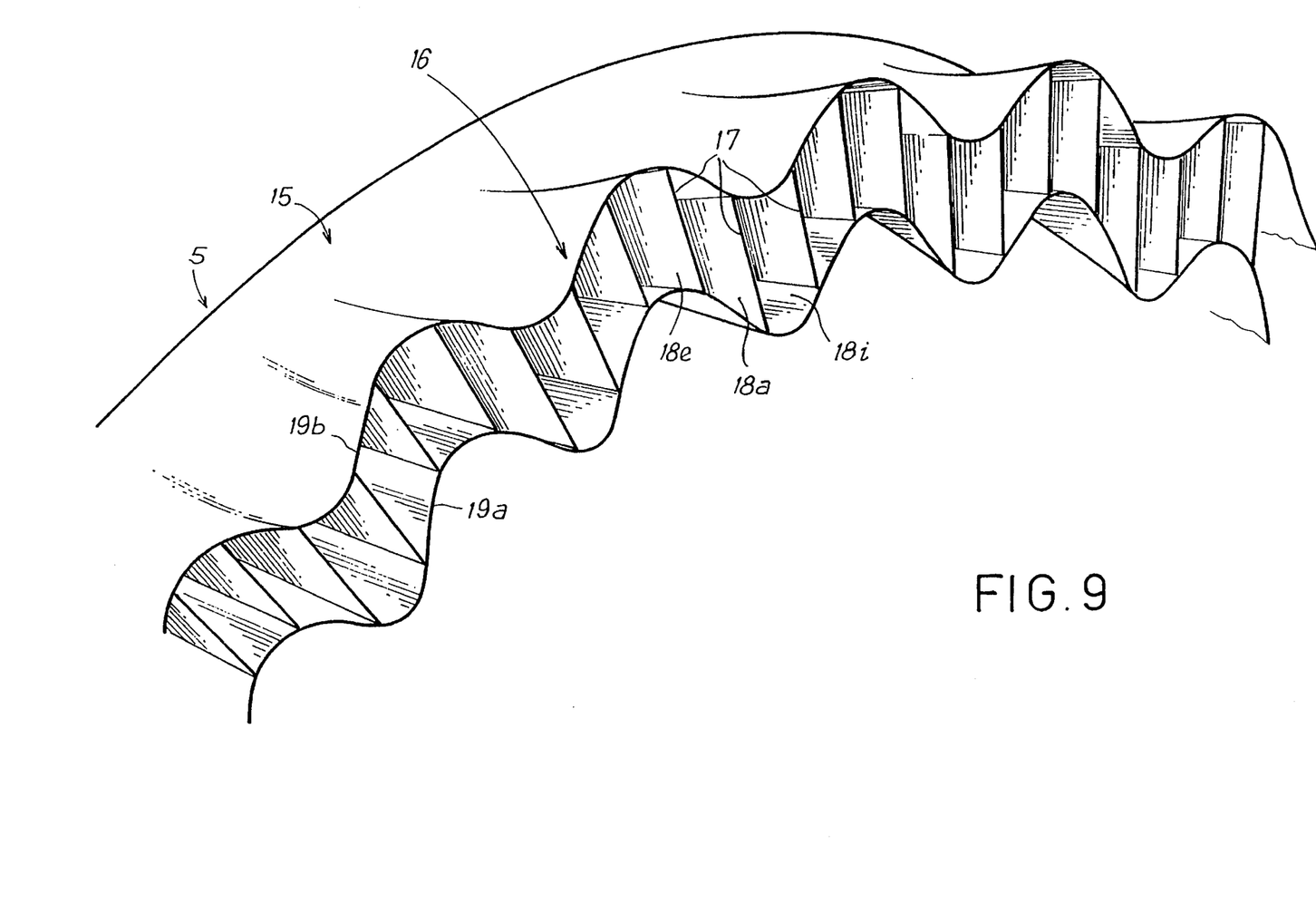
FIG. 9 is a partial, perspective view of a forth embodiment of the diffuser according to the present invention.

FIG. 9 illustrates the diffuser according to the present invention wherein the downstream portion 16 has inner and outer walls 19a and 19b with a generally sinusoidal configuration extending about the longitudinal axis 2. As in the previous embodiments, radially extending partitions 17 separate the conduits into three sets of diffuser outlets 18a, 18i and 18e. This diffuser may be formed as an integral construction utilizing known casting or molding techniques. In addition, splitter wedges 20 or 20a may also be utilized with this configuration.

The foregoing description is provided for illustrative purposes only and should not be construed as any way limiting this invention, the scope of which is defined solely by the appended claims.

We claim:

1. A diffuser for a turbojet engine having an oxidizer compressor located upstream of a generally annular combustion chamber assembly with inner and outer casings extending about a longitudinal axis, inner and outer walls spaced from the inner and outer casings bounding the combustion chamber, an upstream end wall connecting the inner and outer walls, a baffle extending between the inner and outer walls and spaced from the upstream end wall, the baffle defining a plurality of openings, and a plurality of fuel injectors extending through the baffle and the upstream end wall, the diffuser located between the compressor and the combustion chamber assembly and comprising:

a) a plurality of diffuser inlets bounded by inner and outer diffuser walls extending about the longitudinal axis and a plurality of partitions extending substantially radially with respect to the longitudinal axis and interconnecting the inner and outer diffuser walls such that the diffuser inlets are arranged in a substantially circular array and are located so as to receive oxidizer from the compressor; and, b) a plurality of sets of diffuser outlets, each set comprising a plurality of diffuser outlets arranged in a substantially circular array about the longitudinal axis wherein the radius of each set of diffuser outlets is different from the radius of the other sets of diffuser outlets such that the entirety of diffuser outlets comprises a non-circular array about the longitudinal axis whereby the diffusion outlets are displaced in a circumferential direction around the longitudinal axis such that no two diffuser outlets lie on a common radial line extending from the longitudinal axis.

2. The diffuser of claim 1 wherein the partitions are integrated into guide vanes of the oxidizer compressor.

3. The diffuser of claim 1 wherein the diffuser outlets of each set are circumferentially spaced from each other.

4. The diffuser of claim 1 wherein the diffuser outlets of a first set of diffuser outlets are axially aligned with the openings defined by the baffle.

5. The diffuser of claim 4 wherein the diffuser outlets of a second set of diffuser outlets are axially aligned with the fuel injectors.

6. The diffuser of claim 4 wherein the diffuser outlets are also bounded by the inner and outer diffuser walls and the longitudinal partitions.

7. The diffuser of claim 6 further comprising a splitting wedge located in the diffuser outlets of at least one set of diffuser outlets, the splitting wedge having an apex facing in an upstream direction and diverging surfaces extending therefrom.

8. The diffuser of claim 6 wherein the inner and outer diffuser walls have a sinusoidal configuration at the diffuser outlets.

9. A diffuser for a turbojet engine having an oxidizer compressor located upstream of a generally annular combustion chamber assembly with inner and outer casings extending about a longitudinal axis, inner and outer walls spaced from the inner and outer casings bounding the combustion chamber, an upstream end wall connecting the inner and outer walls, a baffle extending between the inner and outer walls and spaced from the upstream end wall, the baffle defining a plurality of openings, and a plurality of fuel injectors extending through the baffle and the upstream end wall, the diffuser located between the compressor and the combustion chamber assembly and comprising:

a) a plurality of diffuser inlets bounded by inner and outer diffuser walls extending about the longitudinal axis and a plurality of partitions extending substantially radially with respect to the longitudinal axis and interconnecting the inner and outer diffuser walls such that the diffuser inlets are arranged in a substantially circular array and are located so as to receive oxidizer from the compressor;

b) a plurality of sets of diffuser outlets, each set comprising a plurality of diffuser outlets arranged in a substantially circular array about the longitudinal axis wherein the radius of each set of diffuser outlets is different from the radius of other sets of diffuser outlets such that the entirety of diffuser outlets comprises a non-circular array about the longitudinal axis; and, c) a splitting wedge located in the diffuser outlets of at least one set of diffuser outlets, the splitting wedge having an apex facing in an upstream direction and diverging surfaces extending therefrom.

10. The diffuser of claim 9 wherein the partitions are integrated into guide vanes of the oxidizer compressor.

11. The diffuser of claim 9 wherein the diffuser outlets of a first set of diffuser outlets are axially aligned with the openings defined by the baffle.

12. The diffuser of claim 11 wherein the diffuser outlets of a second set of diffuser outlets are axially aligned with the fuel injectors.

13. The diffuser of claim 9 comprising a splitting wedge located in each diffuser outlet.

* * * * *